United States Patent

Hansel et al.

[11] 4,069,838
[45] Jan. 24, 1978

[54] FIBER OPTIC LIQUID LEVEL SENSOR

[75] Inventors: William B. Hansel, Media; Paul B. O'Connell, Huntingdon Valley, both of Pa.

[73] Assignee: Sun Oil Company of Pennsylvania, Philadelphia, Pa.

[21] Appl. No.: 690,323

[22] Filed: May 26, 1976

[51] Int. Cl.² ............................................. F16K 21/18
[52] U.S. Cl. ...................... 137/392; 73/293; 250/227; 250/577; 350/96 R
[58] Field of Search ............ 73/293; 137/93, 386, 137/392; 250/227, 577; 340/244; 350/96 B, 96 R

[56] References Cited

U.S. PATENT DOCUMENTS

| B 507,396 | 2/1976 | Kulig | 250/577 |
|---|---|---|---|
| 1,706,857 | 3/1929 | Mathe | 250/577 |
| 2,588,672 | 3/1952 | Turvey | 250/577 |
| 2,606,297 | 8/1952 | Sweet | 250/577 |
| 3,120,125 | 2/1964 | Vasel | 250/577 |
| 3,272,174 | 9/1966 | Pribonic | 73/293 |
| 3,548,657 | 12/1970 | Panerai et al. | 73/293 |
| 3,864,577 | 2/1975 | Pellett et al. | 250/577 |
| 3,894,240 | 7/1975 | Rose | 250/577 |

FOREIGN PATENT DOCUMENTS

| 2,418,964 | 11/1974 | Germany | 137/386 |

*Primary Examiner*—Martin P. Schwadron
*Assistant Examiner*—G. L. Walton
*Attorney, Agent, or Firm*—J. Edward Hess; Donald R. Johnson

[57] ABSTRACT

A liquid level sensor for use when filling containers with hydrocarbons or other liquids is disclosed. A fiber optic bundle is arranged to form a flow path for a light beam in such a manner that the flow path is interrupted when the liquid level reaches a predetermined part of the flow path. The fiber optic bundle can be arranged to sense the liquid level when it approaches and reaches a predetermined height and can be connected to a loading control system in order to automatically control the filling of a tank.

6 Claims, 7 Drawing Figures

U.S. Patent    Jan. 24, 1978    Sheet 1 of 2    4,069,838
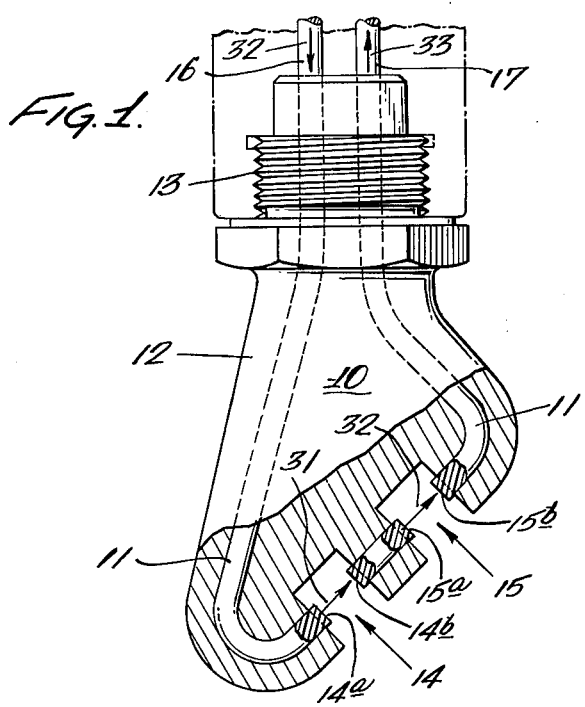
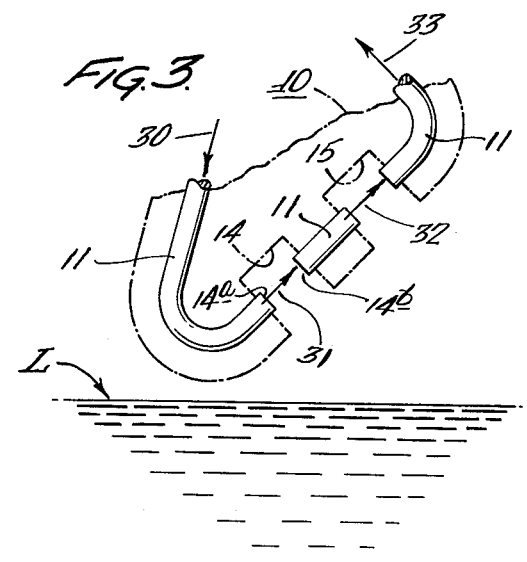
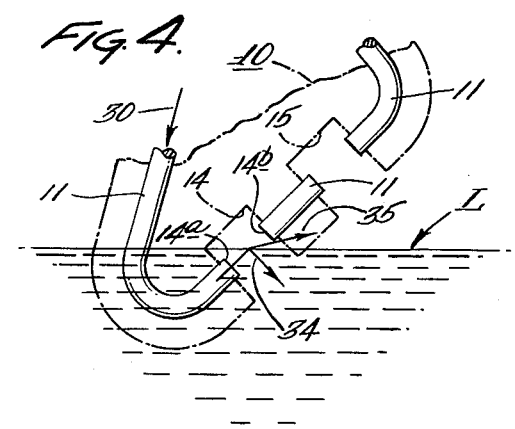
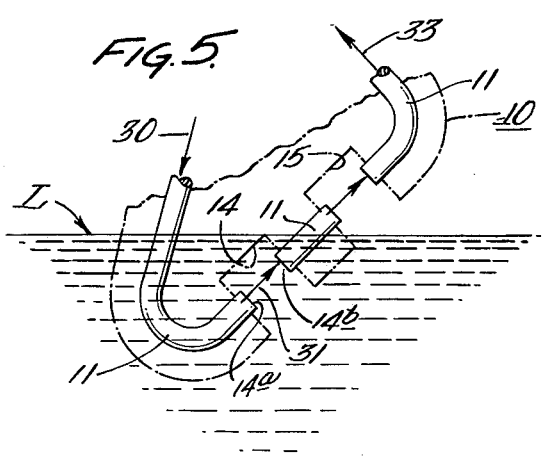
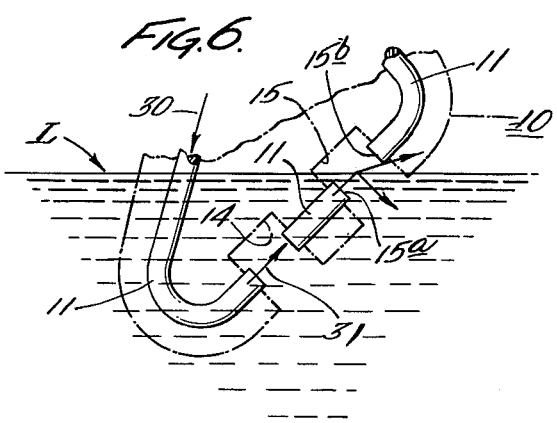
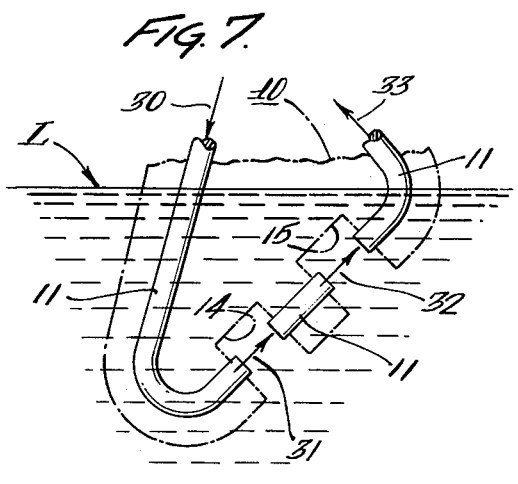

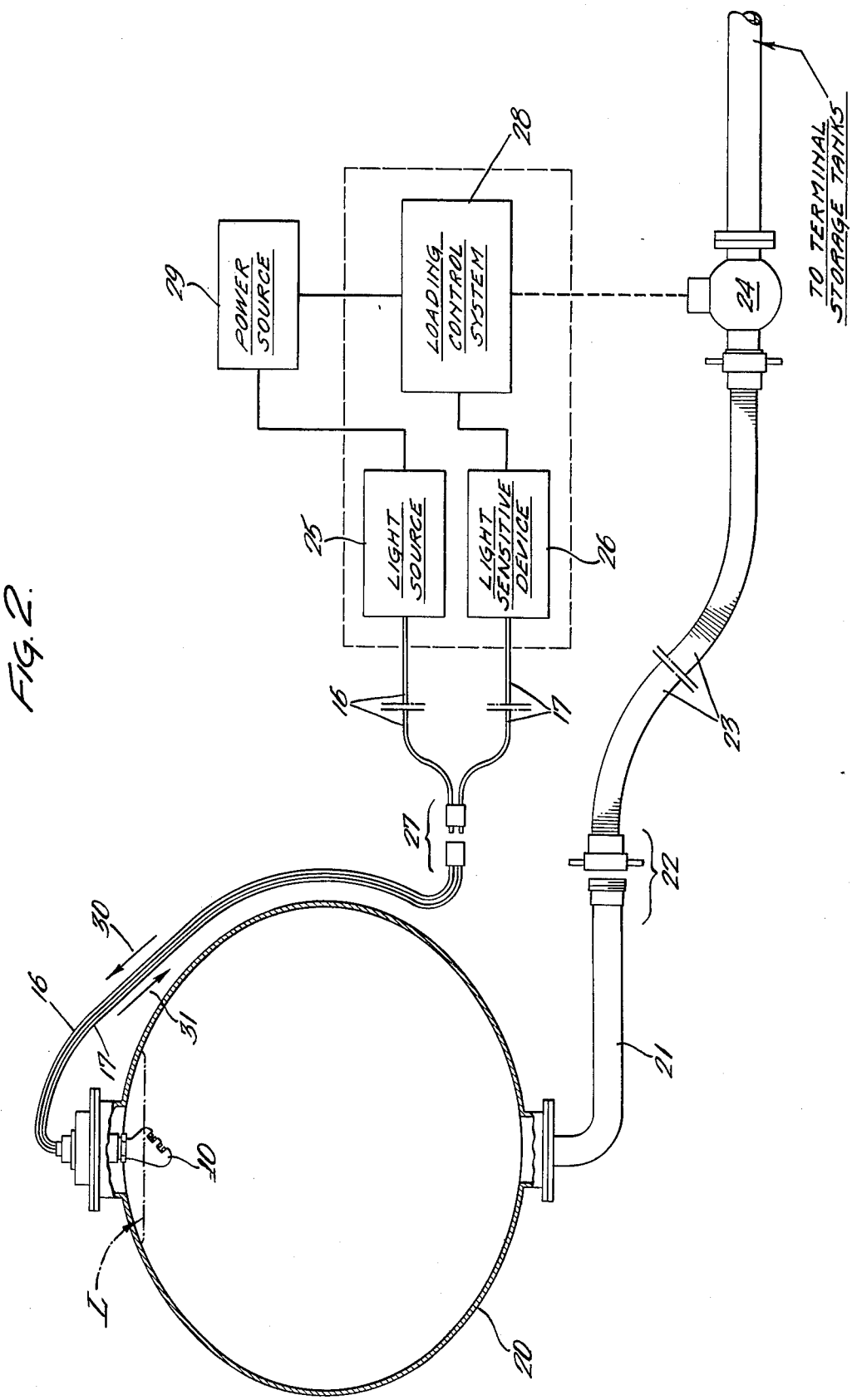

FIBER OPTIC LIQUID LEVEL SENSOR

BACKGROUND OF THE INVENTION

This invention relates to liquid level sensing devices and more particularly to fiber optic liquid level sensing devices.

Due to safety and environmental regulations as well as for other reasons, many tank trucks will have to be filled with hydrocarbons by a bottom loading process. By this method, operators will not be allowed to observe the liquid level since the tank will probably be closed to permit vapor recovery. Therefore, some type of liquid level indicator which can be interfaced with a system for controlling the filling process will be required. When designing a liquid level indicator for hydrocarbon systems, several considerations are important.

The possibility of fire is an ever present danger. For this reason, it is desirable to use equipment that is least likely to cause a spark or to start a fire. While this possibility is extremely remote with most electrical or capacitance sensors, these types of sensors are often best avoided.

The need for a failsafe sensor that can withstand the physical punishment of continuous use is another consideration. Float valves, capacitance probes, and other similar level sensing devices can easily be damaged by continuous abuse, especially if they have moving parts.

Preventing spills is still another problem for safety, economic, and ecological reasons. Reliance on visual aids such as floats is not failsafe since the operator's judgment and alertness is always a factor in preventing spills. Also, with some toxic liquids, when no vapor recovery system is available, the operator should not remain near the liquid while filling the tank. This filling process requires an automatic cut-off when the tank is filled.

SUMMARY OF THE INVENTION

In accordance with a preferred embodiment a liquid level indicator system is provided which utilizes fiber optics to sense the liquid level. The particular system described herein uses a fiber optic bundle to form a flow path for a light beam with a gapped section in which at least one gap is provided in the fiber optic flow path. Light enters the sensor system and is detected by a light sensitive device after it leaves the sensor system. The shape of the path and the manner of installation are such as to place the section of the fiber optic flow path with gaps at a certain angle so that when the liquid level rises to a gap, the light is reflected out of the path and fails to reach the light sensitive device, thereby signaling the position of the liquid level.

A possible system for filling tank trucks could use a level sensor having two gaps and a control system designed to slow down the filling of the tank when the liquid level reaches the first gap and to terminate the filling process when the liquid level reaches the second gap.

The fiber optic tubing can be contained in a sturdy plastic case for protection. No electrical parts are close enough to the liquid to create any fire hazard. The plastic case can be easily adapted to fit in the top of most containers or to fit on a vapor recovery hatch. The inherent nature of the invention requires light to flow completely through the fiber tubing for the pumping system to operate, thereby preventing its operation if the path is broken or some part is inoperative.

A better understanding of the invention and its advantages can be obtained by reference to the following description of the figures and preferred embodiment.

DESCRIPTION OF FIGURES AND PREFERRED EMBODIMENT

FIG. 1 is a fragmentary sectional view of a preferred embodiment of a fiber optic liquid level sensor.

FIG. 2 is a schematic diagram illustrating a possible fiber optic liquid level sensing system and its connection to a tank loading control system.

FIGS. 3 through 7 illustrate the direction of light passing through the fiber optic sensor for various liquid levels.

The fiber optic liquid level sensor 10 contains fiber optic tubing 11 which is bent to take the shape illustrated in FIG. 1. For protection of fiber optic tubing 11 and for maintaining its proper shape, a hard casing 12 is molded around it. A threaded nipple 13 is provided for easy mounting on existing hatch covers or on any other means used to support sensor 10 in its proper position. Fiber optic tubing 11 is interrupted twice to form a gapped section with gaps 14 and 15. The gapped section of fiber optic tubing 11, preferably has a slope of about 45°, measured from the horizontal level. However, this slope will vary depending upon the density of the liquid being received by the container.

A possible system using fiber optic sensor 10 is illustrated in FIG. 2. A tank 20, such as one found on a tank truck, for example, is connected for bottom loading through receptacle 21. Receptacle 21 is connected to the terminal storage tanks, not shown, through drybreak connector 22, hose 23, and flow control means 24, such as a pump or a valve.

The fiber optic level sensing equipment is easily combined with the existing loading system. Fiber optic sensor 10 can be mounted inside the top of tank 20 by any suitable means, such as being connected to the bottom of a hatch cover. The fiber optic leads 16 and 17 extend to a distant location, where light source 25 and photoelectric cell 26 are located. Photoelectric cell 26 is connected to loading control system 28. Power source 29 provides the necessary power requirements for light source 25 and loading control system 28.

A fiber optic connection 27 may be provided for ease of installation and combined with dry break connection 22. The manner of installation is determined by the particular needs of each system. Preferably, fiber optic sensors 10 would be permanently mounted on each tank truck. However, the sensors could be placed in each container prior to filling.

Several kinds of loading control systems can be used. One example is a loading control system designed to have three modes of operation. In mode one, flow control means 24 permits maximum flow rate. In mode two, flow control means 24 reduces the flow rate down to a slower or topping speed. In mode three, the flow is terminated. Loading control system 28 preferably includes a sequential switching system which is activated when photo-electric cell 26 fails to receive any light. Once the filling process begins, control system 28 places flow control means 24 in the correct mode for properly filling the tank. Systems with this capability are common and easily adapted for such a use by one skilled in the art.

The specific operation of fiber optic sensor 10 in this sequence, as illustrated in FIGS. 3-7, will now be discussed. Fiber optic sensor 10 is placed at the top of the tank to be filled, as illustrated in FIG. 2. Loading control system 28 is started in mode one, causing flow control means to permit flow into tank 20 at a predetermined flowrate. At this time, light from light source 25 is passing through fiber optic input lead 16, gaps 14 and 15, and outlet lead 17 in the direction illustrated by arrows 30, 31, 32 and 33. Since the gapped section of fiber optic tube 11 is straight at the points where it is interrupted by gaps 14 and 15, enough light passes through the gaps, and reaches light sensitive device 26 to activate it, as illustrated in FIG. 3 by arrows 31 and 32. When the liquid level, "L," reaches the level of gap 14, between sides 14a and 14b, as shown in FIG. 4, the light leaving tubing 11 at 14a is interrupted before reaching point 14b of tubing 11, thereby deactivating light sensitive device 26 and causing loading control system 28 to switch to mode two. The light interruption is caused by having the light travel through two different mediums having different indices of refraction. Instead of traveling in a straight line, most of the light is reflected back down into the liquid, as illustrated by arrow 34, and the rest is refracted at an angle away from point 14b of fiber optic tubing 11, as illustrated by arrow 35 in FIG. 4.

Once the liquid level rises above gap 14 so that point 14b is covered, as shown in FIG. 5, light passes through the gap and the rest of fiber optic tubing 11, thereby reactivating light sensitive devices 26. As the liquid level continues to rise, it reaches gap 15, between points 15a and 15b, as shown in FIG. 6, causing the light flow to again be interrupted and light senstive device 26 to be deactivated again. Loading control system 28 is now switched into mode three, which causes flow control means to terminate the filling process.

For best results, sensor 10 is placed far enough from the top of tank 20 to account for the response time of loading control system 28 and flow control means 24. In this manner, the tank is automatically filled to the same level each time and no liquid is wasted by spills.

Preferably, gaps 14 and 15 are small enough so that when they are completely filled with a liquid, enough light is still received by the other side to keep light sensitive device 26 activated, even though some refraction of the light by the liquid takes place. Also, the fiber optic tube is preferably mounted at such an angle that when the liquid level rises to either gap, the upper end (14b, 15b) is not covered by liquid until the lower side (14a, 15b) has been completely covered. This assures that a complete interruption of the light flow is achieved when the liquid level rises.

For added safety, control system 28 cannot be activated unless the fiber optic system is working and connected properly. A break in the fiber optic line, a burned out light source, or failure to connect sensor 10 would prevent loading control system 28 from operating since no light reaches light sensitive device 26.

It is entirely possible that more modes of operation might be desired. The addition of extra gaps and expansion of the switching capabilities can accomodate this need.

While a particular embodiment of this invention has been shown and described, it is obvious that changes and modifications can be made without departing from the true spirit and scope of the invention. It is the intention of the appended claims to cover all such changes and modifications.

The invention claimed is:

1. A system for detecting liquid reaching a predetermined level in a container, and comprising:
    a. an optic tubing extending in the container at an angle inclined to the vertical such that as the level of liquid in the container around the tubing rises or falls different sections of the optic tubing will be covered or uncovered by the liquid, said optic tubing having a gapped section having a gap which liquid in the container may fill with the geometric arrangement of the gap and the angle inclined to the vertical being such that light normally passes through said optic tubing and through said gap when the liquid level in the container is not in said gap but when the liquid level in the container rises into the gap, radiation which normally passes through the gap and remains in the tubing is deflected out of the gap and out of the tubing because of the different indices of refraction of the air and the liquid in the gap;
    b. a light source providing light at a first end of said optic tubing, whereby light passes into said optic tubing; and
    c. light sensitive means at the second end of said optic tubing for detecting the presence of light at the second end of the optic tubing, whereby the interruption of light detected by said light sensitive means signifies the liquid level being at the level of the gap in the optic tubing.

2. System recited in claim 1, wherein the first end of the optic tubing is connected to the lower end of the gapped section and the second end of the optic tubing is connected to the upper end of the gapped section.

3. System recited in claim 1, further comprising means, responsive to the light sensitive means, for controlling the flow of liquid into the container.

4. System recited in claim 1, wherein said gapped section of optic tubing has a second gap located at a different level, with said second gap having a geometric arrangement similar to said first gap, whereby light passing through the optic tubing will be interrupted as the liquid level in the container passes through each of said gaps.

5. System recited in claim 4, further comprising means, responsive to the light sensitive means, for controlling the flow of liquid into the container in a sequential fashion as the liquid level rises from the lowest gap in the gapped section of the optic tubing, to the highest gap in the gapped section.

6. System recited in claim 5 wherein said controlling means includes means, responsive to a first interruption of light through the optic tubing for slowing the flow of liquid into the container and responsive to a second interruption of light through the optic tubing for shutting off the flow of liquid into the container.

* * * * *